(12) United States Patent
DeJong (10) Patent No.: US 7,570,859 B1
(45) Date of Patent: Aug. 4, 2009

(54) OPTICAL SUBSTRATE GUIDED RELAY WITH INPUT HOMOGENIZER

(75) Inventor: Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 50 days.

(21) Appl. No.: 12/167,892

(22) Filed: Jul. 3, 2008

(51) Int. Cl.
*G02B 6/00* (2006.01)
(52) U.S. Cl. ...................................... 385/133
(58) Field of Classification Search .................. 385/31, 385/146, 147, 901, 133
See application file for complete search history.

(56) References Cited

U.S. PATENT DOCUMENTS

| | | | |
|---|---|---|---|
| 6,829,095 | B2 | 12/2004 | Amitai |
| 7,021,777 | B2 | 4/2006 | Amitai |
| 7,418,170 | B2 | 8/2008 | Mukawa et al. |
| 2005/0180687 | A1 | 8/2005 | Amitai |
| 2006/0228073 | A1* | 10/2006 | Mukawa et al. ............... 385/31 |
| 2006/0274296 | A1 | 12/2006 | Tolbert et al. |
| 2007/0159673 | A1 | 7/2007 | Freeman et al. |
| 2007/0171328 | A1 | 7/2007 | Freeman et al. |
| 2008/0025667 | A1 | 1/2008 | Amitai |
| 2009/0015929 | A1* | 1/2009 | DeJong et al. ............... 359/633 |

FOREIGN PATENT DOCUMENTS

| | | |
|---|---|---|
| WO | WO-2006/085308 | 8/2006 |
| WO | WO-2006/054928 | 5/2007 |
| WO | WO-2008/023367 | 2/2008 |

* cited by examiner

*Primary Examiner*—Sarah Song
(74) *Attorney, Agent, or Firm*—Kevin D. Wills (57) ABSTRACT

An optical substrate guided relay (300) includes a light homogenizing device (321) coupled to an optical input device (301) in an offset orientation along a first interface (331). The light homogenizing device (321) receives light from an image-producing source (804), which can be a scanned beam source, and creates multiple copies of the received light by way of a light homogenizing device (321). The light and copies are delivered to the optical input device (301). An optical substrate (302) receives light from the optical input device (301) as the light spirals down the optical input device (301) due to the offset coupling with the light homogenizing device (321). An optical output device (303), coupled to the optical substrate (302) distally from the optical input device (301) delivers the light to a user (803) with one or more partially reflective surfaces (304).

20 Claims, 5 Drawing Sheets

OPTICAL SUBSTRATE GUIDED RELAY WITH INPUT HOMOGENIZER

BACKGROUND

1. Technical Field

This invention relates generally to optical display devices, and more particularly to an optical device, such as a substrate guided relay, that employs a light homogenization device at its input and that is configured to transfer light from a source to a user's eye.

2. Background Art

Substrate guided relays are devices that transmit light rays from a source to a viewer. Generally, substrate guided relays are optical image transfer devices that include a substrate, which may manufactured from glass or fused silica, and which directs light from a relay input to a relay output. This light can be guided along its path by the optical transfer properties of the substrate. These optical transfer properties can additionally work in tandem with reflective or diffractive devices coupled to the substrate. The surfaces of the substrate can also work to direct the light to its intended destination. In many applications, this end destination is a viewing region that is directed to a projection surface or a user's eye. One application of substrate guided relays is that of a near-to-eye display in which the viewing region projects directly into the pupil of a user.

Substrate guided relays generally include three basic components: an input that collects and receives light from a source, a substrate that transfers the light, and an output that delivers light away from the substrate. In many applications, it is advantageous to keep the various components of the substrate guided relay assembly small, as they are sometimes used as head mounted displays or other compact display systems. This desire to keep size to a minimum creates challenges, however, for the designer. In particular, when a source of light is small, the light often has a smaller spatial extent. It can therefore be challenging for a substrate guided relay designer to create a display having a pupil that is much larger than the extent of the source.

When large projection sources are used, the image pupil is often on the order of the original image and little or no pupil expansion may be required. Where required, the expansion may be needed in only one direction. When the projection source becomes smaller, however, the pupil becomes smaller. To create a uniformly bright image, a great deal of pupil expansion must occur. Some scanned beam light sources producing narrower input beams do not generate sufficient pupil sizes for uniform images in traditional substrate guided relays. Further, field of view and image size can also be limited when small light sources are used.

There is thus a need for an improved substrate guided relay capable of expanding the pupil and enhancing output uniformity that is compatible with compact, scanned light sources.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention include a substrate guided relay that includes an optical input device and an optical substrate. The optical input device and optical substrate are coupled together. In one embodiment, they are coupled together along a first plane. In one embodiment, a light homogenizing device is then coupled atop the optical input device, such that a plane defined by the stacked light homogenizing device and optical input device is substantially perpendicular to the plane defined by the optical input device and the optical substrate. When viewed in cross section in this embodiment, the assembly resembles an L-shape, with the optical substrate and optical input device forming the long side of the L, and the optical input device and light homogenizing device forming the short side of the L. The L is not always perfect, however, as the light homogenizing device is offset with respect to the optical input device in various embodiments.

The optical input device can be coupled to the optical substrate at various locations. For example, in many of the figures described herein, the optical input device is illustrated as being coupled to an edge of the optical substrate. However, other configurations exist. For instance, the optical input device can be coupled to the top of the optical substrate or to the bottom of the optical substrate. Further, the light homogenizing device can be coupled to any face of the optical input device. Light can be inserted into the substrate guided relay through the light homogenizing device, the optical input device, or into both.

In one embodiment, the light homogenizing device includes a horizontal partially reflective coating disposed within the light homogenizing device, and which runs the length of the light homogenizing device. Light is coupled from a source, such as a scanning light source, into the light homogenizing device. Light is generally confined within the light homogenizing device by total internal reflection. The light entering the light homogenizing device travels down the length of the light homogenizing device. As the light passes along the light homogenizing device, it encounters the horizontal partially reflective coating and copies of the light are produced.

When light encounters the interface between the light homogenizing device and the optical input device—which in one embodiment is larger in cross section than the light homogenizing device—some of the light enters the optical input device. When this light reaches an edge surface of the optical input device, it mimics the path it had in the light homogenizing layer due to the offset edges of the light homogenizing device with respect to the optical input device. As such, the light travels in a spiral pattern due to the longitudinal offset.

This two-dimensional homogenizing structure creates offset copies of the input light due to the combination of partially reflective coatings and offset edges. A high degree of homogenization is achieved in two directions due to the parallel coating structure. Further, multidimensional homogenization can be created without the need to create both p-polarizing partially reflective coatings and s-polarizing partially reflective coatings in a single device. Either will suffice, whichever is less expensive and simpler to manufacture.

Figure 1:
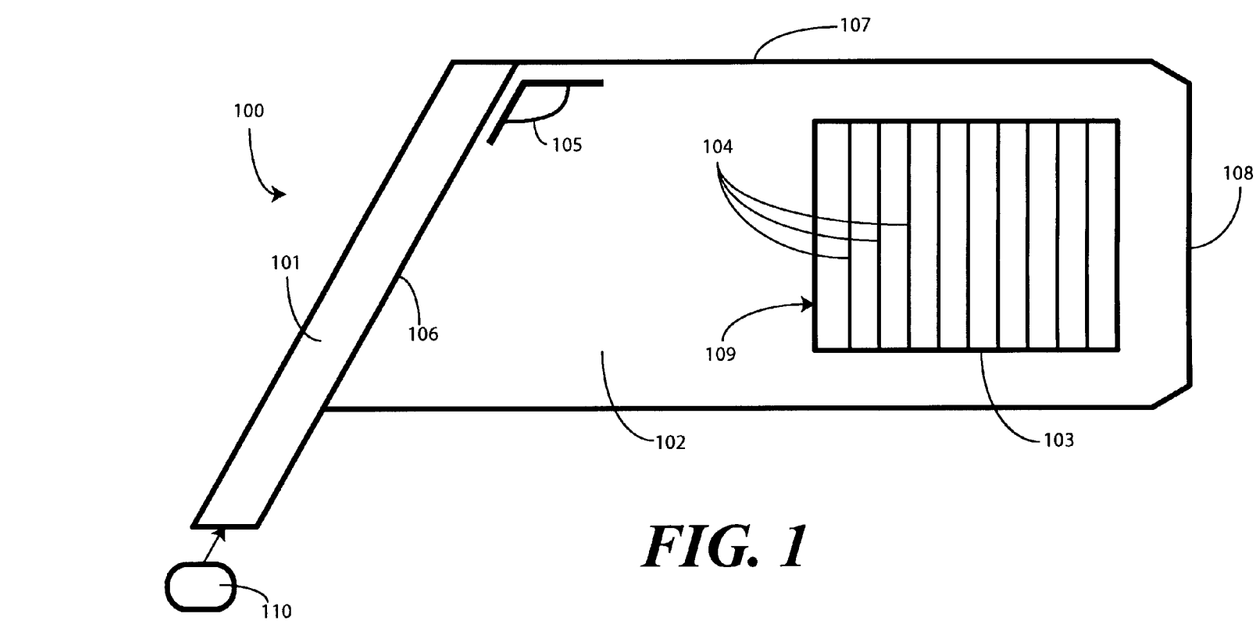
FIG. 1 illustrates a top, plan view of one embodiment of a substrate guided relay.
Figure 2:
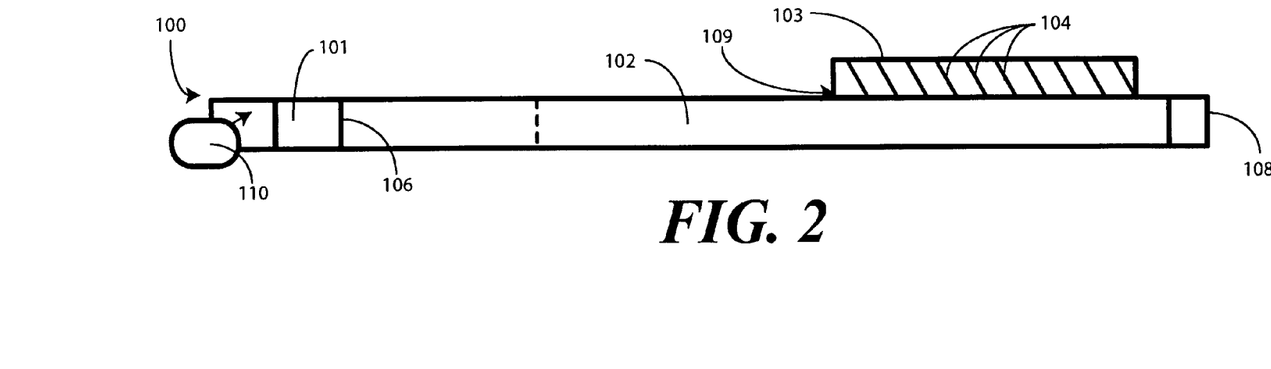
FIG. 2 illustrates a side elevation view of one embodiment of a substrate guided relay.

Turning now to FIGS. 1 and 2, illustrated therein is one embodiment of a substrate guided relay 100 having an optical input device 101, an optical substrate 102, and an optical output device 103. FIG. 1 is a top, plan view of the substrate guided relay 100, while FIG. 2 is a side elevation view of the substrate guided relay 100. Embodiments and operating characteristics of such substrate guided relays are described in commonly assigned, copending U.S. patent application Ser. No. 11/775,511, filed Jul. 10, 2007, entitled "Substrate-Guided Relays for Use with Scanned Beam Light Sources," which is incorporated herein by reference.

In the illustrative embodiment of FIG. 1, the optical input device 101 is coupled to the optical substrate at an angle 105. Said differently, in one embodiment the optical input device 101 is coupled to the optical substrate 102 in an orientation such that the optical axis of the optical input device 101 intersects the optical axis of the optical substrate 102 at a non-orthogonal angle. This angle affects how light leaves the optical input device 101 and enters the optical substrate 102. While this angle 105 can be orthogonal, and while various angles can work for angle 105, in one embodiment angle 105 is between 30 and 60 degrees. Experimental testing has shown that an angle of 45 degrees is effective for many applications.

The optical input device 101 collects and receives light. This light can be collected from a light source, which will be described in more detail later, or from a light homogenizing device. Where light is delivered from a source, one suitable light source is a Microelectromechanical System (MEMS) scanned light source. Such a light source works well with embodiments of the present invention due to its small, compact size. Further, such a scanned source has other beneficial features, including the fact that all three colors are scanned at the same time, thereby reducing blur occurring due to source movement. It will be clear to one of ordinary skill in the art having the benefit of this disclosure, however, that embodiments of the present invention are not so limited. Other light sources can also be used, including liquid crystal display sources, organic light emitting diode light sources, light emitting diode sources, digital light processing light sources, liquid crystal on silicon light sources, and so forth.

Light is delivered from the optical input source 110 to the optical substrate 102 through a first interface 106. The optical input source 110 can be coupled to the optical substrate 102 along the first interface 106 in a variety of ways, including adhesives, glues, and epoxies. In one exemplary embodiment, the optical input source 110 is "optically contacted" to the optical substrate 102. This bond can be enhanced by chemically treating the surfaces prior to contacting.

In one embodiment, the first interface 106 includes a partially reflective coating. While various applications and desired performance attributes can work to determine what kind of partially reflective coating is used, in one embodiment the first interface 106 includes a metallic coating, such as silver, that is configured to work as a p-polarizing partially reflective coating. P-polarizing partially reflective coatings can be used to vary reflectance along the boundary. A p-polarizing partially reflective coating can have a high reflectance near the input and a lower reflectance further from the input. Such an effect can be achieved with a variable thickness coating that includes a metal layer.

As an aside concerning the coatings described herein, in substrate guided relay systems, light interactions with partially reflective coatings often happen at or near Brewster's angle. In Brewster's angle interactions, the p-polarization component reflection is often zero for common layered reflective materials. (This angle can occur in roughly a thirty to fifty degree range.) When making partially reflective coatings, it is common practice to select at least two materials and layer them together: a high refractive index material and a low refractive index material placed in layers upon a substrate guided relay surface to obtain the desired reflectance. Multiple layers can be used, but materials having a large difference in refractive index generally require fewer layers to achieve a given reflectance.

At Brewster's angle, the reflectance for a material pair is essentially zero. At near Brewster's angles, the reflectance is generally low. However, the reflectance changes rapidly with angle and wavelength. As a result, normally effective coating material pairs can become poor choices for a partially reflective coating. When the angles of interest (in the design of the substrate guided relay) for high/low index pairs cover Brewster's angle, manufacturing material pairs having significant reflectance (>20%) for p-polarized light over a range of angles and wavelengths is difficult. Further, creating p-polarization partially reflective coatings that are non-absorbing and have flat wavelength responses is also difficult. Generally speaking a large number of reflective material layers are required.

The partially reflective coatings that will be descried herein, such as the partially reflective coating that can be used at the first interface 106, are generally known to those of ordinary skill in the art. Such coatings can be used to reflect some components of incident light and transmit others. Further, such coatings can be used transmit or reflect certain polarizations of light. These coatings can be metallic layers—such as thin layers of silver. Alternatively, they may be multilayer structures deposited by a vapor deposition process or other suitable manufacturing process.

Some coatings can be configured to preferentially reflect incident rays across a particular range of angles. For example, several monolithic layers of partially reflecting material can be configured to exhibit a polarization preference, and angle preference, or a combination thereof. Alternatively, separate angle preferential and polarization preferential partial reflective layers may be used, with each layer contributing a portion of the reflected energy.

As used herein, an s-polarization partially reflective coating includes coatings that have an s-polarization reflectance within a thirty to seventy percent range (some occurring near fifty percent), and a lower (generally less than ten percent or so) reflectance p-polarization reflectance for angles and wavelengths of interest. A p-polarization partially reflective coating includes coatings that reflect both p-polarized light and s-polarized light, and exhibit reflectance of p-polarized light at a wavelength and angle of interest greater than 20% operating in the vicinity of Brewster's angle (for a low index material with an index of about 1.5 and a high index material with refractive index of 1.7-2.1, the angle is about 50 degrees when going from high index to low index, and 30 degrees when going from low index to high index). A partially reflective coating used for applications well away from Brewster's angle would generally be an s-polarization partially reflective coating as no special design considerations are made to obtain a significant (>20%) p-polarization reflectance.

Once light is delivered from the optical input device 101 to the optical substrate 102 through the first interface 106, the light passes along the optical substrate 102 to the optical output device 103. In one embodiment of the present invention, the optical substrate 102 comprises a single layer optical substrate that is less than four to five millimeters thick and includes no homogenizing layer. In one embodiment, the length of the overall optical substrate 102 is generally between thirty and one hundred millimeters. The distal end 108 of the optical substrate 102 can be squared, semi-hexagonal, rounded, or may take other shapes. Additionally, the top and bottom edges of the optical substrate 102 can also take on a variety of shapes or geometrical configurations. For instance, the portion of the optical substrate 102 used to transmit the image can be a trapezoid in cross section that encloses the contact points between the optical input device 101 and the optical substrate 102, and the most distal corners of the optical output device 103.

In some embodiments, light passing along the optical substrate 102 is confined within the optical substrate 102 by the principles of total internal inflection. When the light reflects off an edge of the optical substrate 102, e.g., edge 107, it is generally reflected at an equal and opposite angle to the angle of incidence and continues propagating along the optical substrate 102.

Once light as passed sufficiently along the optical substrate 102, distally from the optical input device 101, the light reaches the optical output device 103. The optical output device 103 is configured to receive light from the optical substrate 102 and to enable a viewer (not shown) to see a displayed image, whether it be projected on a projection surface or directly into the viewer's eye. In one embodiment, the optical output device 103 directs light to the viewer through a plurality of partially reflective layers 104. Note that the optical output device 103 may be disposed either on top of, or beneath, the optical substrate 102.

As with the optical input device 101, the optical output device 103 can be coupled to the optical substrate 102 in a variety of ways, including adhesives, glues, or via an optical contacting process. In one embodiment, a second interface 109, which occurs between the optical substrate 102 and the optical output device 103, includes a partially reflective coating. In one embodiment, this partially reflective coating comprises a multi-layer, s-polarizing partially reflective coating. Light enters the optical output device 103 through the second interface 109 and, where used, the partially reflective coating.

To further enhance the "see-through transmission" of this interface, this reflective coating can be designed to have high transmission in the opposite polarization and high transmission in both polarizations at lower angles—see-through angles. In one embodiment, the guiding angles (angles at which light propagating in optical substrate 102 encounters its top and bottom surfaces) are generally larger than forty degrees.

One example of a partially reflective coating suitable for use in the second interface 109 is that of a multi-layer coating comprising an angle-selective reflector, a polarization-selective reflector, and a polarization rotator. Note that in some embodiments these layers may be incorporated in single layers. Incident light beams having a first polarization and a first angle are received by the coating. An angle-selective reflector in the coating partially reflects the received beam where the angle of incoming beam corresponds to the angle preference of the coating. Energy not reflected then passes through the reflector layer and is incident upon the polarization-selective reflector layer. The polarization-selective reflector layer then reflects a portion of the energy where the polarization of the received beam that has not already been reflected by the angle-selective reflector layer corresponds to the preferred polarization. The non-reflected portion of the beam continues through polarization-selective reflector layer and is rotated by the polarization rotator layer. This portion then continues as a transmitted beam. With an s-polarizing partially reflective coating, s-polarized beams pass through the partially reflective layer.

As mentioned above, in one embodiment, the optical output device 103 comprises a series of partially reflective layers 104 that are configured to receive light from the optical substrate 102 and to direct the light away from the substrate guided relay 100. In so doing, the series of partially reflective layers 104 direct light toward a viewing region, which can either be a projection surface or, in some embodiments, a user's pupil. Where the viewing region is that of a user's eye, the luminous flux from the optical output device 103 containing all portions of the image can be characterized by an exit pupil. Where the exit pupil is sufficiently large as to cover the user's pupil, the user will be able to view images presented by the substrate guided relay 100 without vignetting. To observe an entire image at once, the exit pupil generally must be large enough to fill the user's pupil over the range of pupil positions required by a particular application.

The array of partially reflective layers 104 helps both to direct light away from the substrate guided relay 100 and to expand the exit pupil of the overall device. Note that while partially reflective coatings are used as the partially reflective layers 104 in one embodiment, it will be clear to those of ordinary skill in the art having the benefit of this disclosure that the invention is not so limited. Other devices, including diffractive elements or lenses, may also be used in conjunction with the optical output device 103.

Also as noted above, when the source delivering light to the substrate guided relay 100 is sufficiently large, light from all image points (or pixels) can be delivered to the optical input source 110 such that an image is delivered to a viewer as a complete image with sufficient uniformity. However, when a substrate guided relay is used with a compact light source, such as a scanned beam source that is desirable for near-to-eye optics due to its compact size and lightweight construction, brightness and uniformity of the image can suffer due to the small diameter of input light. In accordance with embodiments of the present invention, to produce output images of sufficient uniformity or brightness, a homogenization device is added to the optical input device 101 to make many copies of the input beam of light. This process of making copies is generally referred to as "homogenization" of light. As design requirements call for large exit pupils and large fields of view, for example in near-to-eye applications, homogenization helps to ensure sufficient brightness across the image as a whole when viewed from any position in the exit pupil of the system. Furthermore, homogenization can be required in multiple directions then the input source is smaller than the desired exit pupil more than one direction.

It can be advantageous to use the homogenization device because in some substrate guided relay systems it can be difficult to create sufficient homogenization with partially reflective coatings disposed in two dimensions. This is true due to the differing polarization response of light interacting with multi-dimensional coating layers. For instance, one polarization, such as p-type polarization that occurs in the plane of incidence to a medium change, tends to pass through many partially reflective coatings due to the Brewster's angle effect. It can be very difficult to get even a small amount of p-polarized light to reflect from a non-metalized coating, even when many layers are used. Further compounding the problem, p-polarized partially reflective coatings tend to exhibit wide variations in reflectance as a function of wavelength and angle of incidence. For this reason, many p-polarizing partially reflective coatings do not homogenize light with sufficient effectiveness as to be used in near-to-eye substrate guided relay applications with scanned beam sources. Metal partial reflective coatings can be used to produce sufficiently good quality p-polarization coatings with desirable reflectance properties. However each time the light encounters these coatings a fraction (typically ten percent or more) of the light is absorbed. These losses can be acceptable if light does not encounter the surface a large number of times and/or if there are few of these types of coatings in a particular system. However, for homogenization of a small input source to obtain a large pupil, multiple p-polarization reflective surfaces are typically required. Further, light generally encounters each surface many times, thereby reducing the optical efficiency of the system.

Light that is s-polarized is generally easier to homogenize with partially reflective coatings. S-polarized light can be reflected with a partially reflective coating deposited along an interface having only a few layers. Further, s-polarizing partially reflective coatings are often less expensive than are the p-polarizing counterparts. S-polarizing partially reflective coatings generally provide better performance across wavelength and angle than do p-polarizing partially reflective coatings. Embodiments of the present invention take advantage of these characteristics to provide a high degree of homogenization in two directions. This "multi-directional" homogenization provided by embodiments of the invention described herein makes it possible to construct substrate guided relays that are smaller and cheaper to manufacture. Further, embodiments of the present invention have better brightness and color uniformity, yet have larger fields of view and exit pupils than do conventional substrate guided relays.

Figure 3:
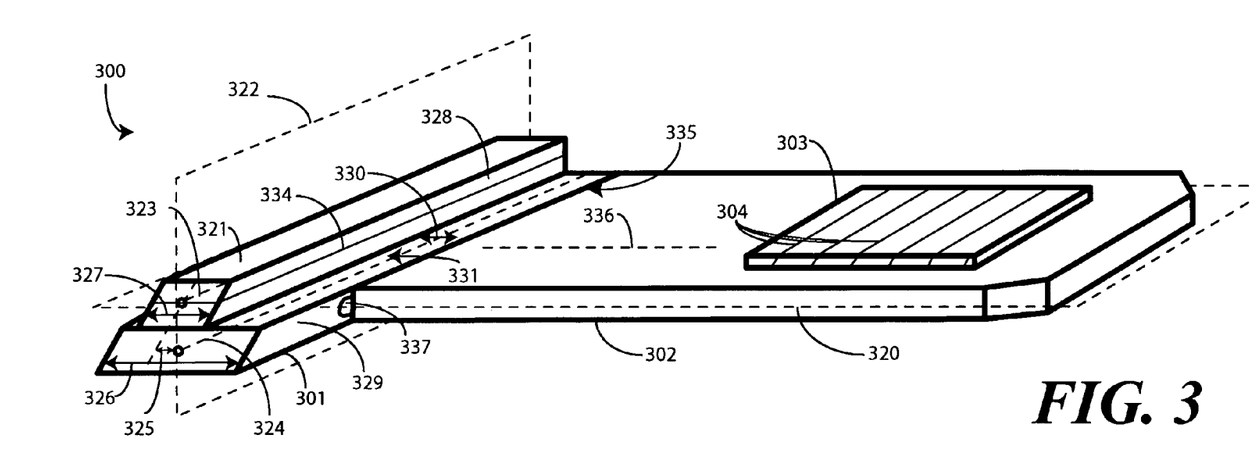
FIGS. 3 and 4 illustrate a perspective view and plan view, respectively, of one embodiment of a substrate guided relay having a light homogenizer coupled to the input in accordance with embodiments of the invention.
Figure 4:
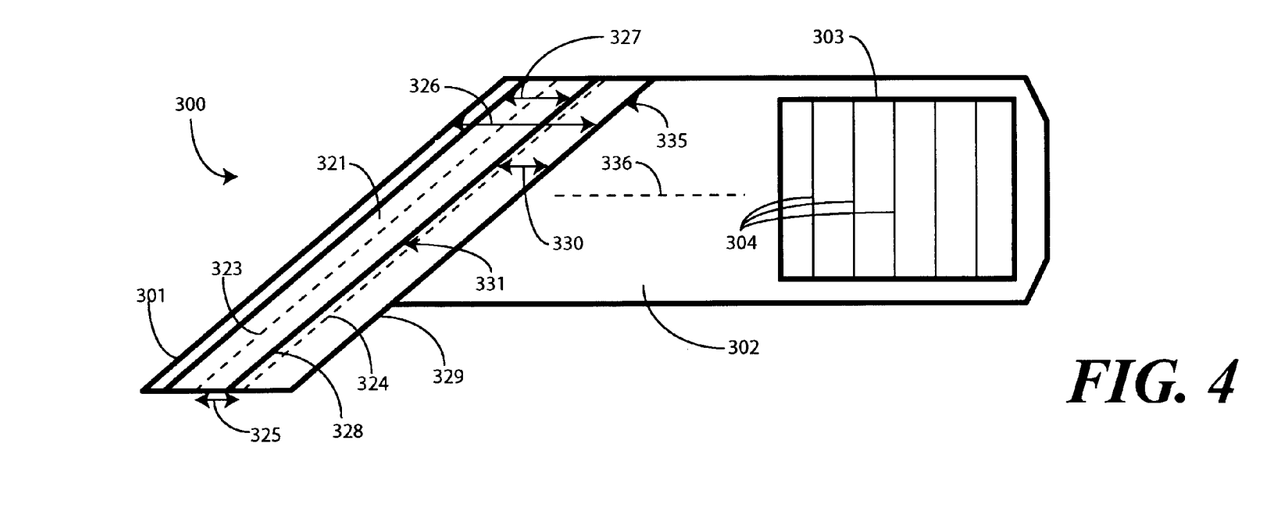

Turning now to FIGS. 3 and 4, illustrated therein is one embodiment of such a substrate guided relay 300 employing a light homogenizing device 321. FIG. 3 illustrates a perspective view, while FIG. 4 illustrates a plan view. The substrate guided relay 300 includes an optical input device 301, a light homogenizing device 321, an optical substrate 302, and an optical output device 303.

In the exemplary embodiment of FIG. 3, the optical input device 301 is disposed distally across the optical substrate 302 from the optical input device 301. The optical output device 303 is configured to receive light from the optical substrate 302 and direct the light away from the optical substrate 302 with one or more partially reflective surfaces 304 disposed within the optical output device 303. In one embodiment, the one or more partially reflective surfaces 304 comprise s-polarizing partially reflective coatings.

As the geometrical relationships of the various components can affect the homogenization of light in multiple dimensions, for description purposes, imaginary alignment planes will be used to describe these relationships. These planes are references only—i.e., they are not real components—and are used to describe the physical orientations of the various components in illustrative configurations. In the embodiment of FIG. 3, the optical input device 301 and the optical substrate 302 are coupled together so as to define a first plane 320. This first plane 320 passes generally through the optical substrate 302 lengthwise, and widthwise through the optical input device 301.

A light homogenizing device 321 is coupled to the optical input device 301. In one embodiment, the light homogenizing device 321 is coupled to the optical input device 301 substantially orthogonally relative to the plane defined by the optical substrate 302. Said differently, the light homogenizing device 321 and the optical input device 301 are coupled together so as to define a second plane 322 that runs height-wise (as drawn in FIG. 3) through the light homogenizing device 321 and the optical input device 301. In one embodiment, the first plane 320 and the second plane 322 are substantially orthogonal.

In one embodiment, the light homogenizing device 321 is offset from the optical input device 301. This is best viewed by looking at the central axes of the light homogenizing device 321 and the optical input device 301, respectively. Where the second plane 322 passes through the lengthwise central axis 323 of the light homogenizing device 321 and is orthogonal to the first plane 320, the lengthwise central axis 324 of the optical input device 301 is offset from the second plane 322 by a predetermined amount 325. Note that this offset amount 325 can be to either side of the second plane 322 and can vary from a very small amount (tenths of millimeters) to the sectional width 326 of the optical input device 301.

While the light homogenizing device 321 is offset relative to the optical input device, the placement of the light homogenizing device 321 can vary across its interface with the top of the optical input device 301. For example, in the illustrative embodiment of FIG. 3, the light homogenizing device 321 includes one edge 328 that is substantially parallel with the second plane 322. Similarly, the optical input device 301 includes one or more edges 329 that are substantially aligned with the second plane 322. In one embodiment, where the cross sectional width 327 of the light homogenizing device 321 is less than the cross sectional width 326 of the optical input device, these edges 328,329 can be aligned. In another embodiment, these edges 328,329 are offset by a predetermined amount 330. In another embodiment, the edges opposite edges 328,329 are aligned. In effect, the light homogenizing device 321 can be placed anywhere along the interface 331 between it and the optical input device 301 so long as a portion of each device's cross sectional widths 326,327 overlap. In each embodiment shown, however, the light homogenizing device 321 and optical input device 301 are disposed off-center to each other along the interface 331, which is along one edge of the optical input device 301 in the embodiment of FIG. 3. Note that the axes can be aligned. However, where this is the case, homogenization can be reduced unless other modifications are made.

Regardless of placement, in one embodiment the lengthwise axis 323 of the light homogenizing device 321 is parallel with the length-wise axis 324 of the optical input device. For many applications, such a configuration will provide adequate coupling of light from the light homogenizing device 321 to the optical input device 301. It will be clear to those of ordinary skill in the art having the benefit of this disclosure that the invention is not so limited, however. Where other geometric configurations of light homogenizing devices and optical input devices are employed, other axes configurations may be used.

In one embodiment, the cross sectional size of the light homogenizing device 321 is smaller than that of the optical input device 301. For instance, in such an embodiment the cross sectional width 327 of the light homogenizing device 321 is shorter than the cross sectional width 326 of the optical input device 301. In another embodiment, the cross sectional area of the light homogenizing device 321 is less than that of the optical input device.

While a smaller light homogenizing device 321 is illustrated in FIG. 3, it will be clear to those of ordinary skill in the art having the benefit of this disclosure that the invention is not so limited. For example, in an alternate embodiment, the cross sectional size of the light homogenizing device 321 may be larger than that of the optical input device 301. In yet another embodiment, the light homogenizing device 321 and the optical input device 301 can be similar in size and stair-stepped to produce to offsets (one on each side).

In one embodiment, the light homogenizing device 321 includes at least one partially reflective coating layer 334 disposed therein. The partially reflective coating layer 334, which in one embodiment is disposed substantially parallel to the interface 331 between the light homogenizing device 321 and the optical input device 301 and substantially parallel to the first plane 320, is configured to create copies of incoming light received by the light homogenizing device 321. When a source, such as a scanned beam source, projects light into the light homogenizing device 321, the light begins to propagate down the light homogenizing device 321. As it does, the light intersects the partially reflective coating layer 334. One component of the incident light reflects off the partially reflective coating layer 334, and another passes through. As such, a copy of the light is made. This process continues as the light traverses down the light homogenizing device 321. In one embodiment, the partially reflective coating layer 334 comprises an s-polarizing partially reflective multi-layer coating. However, p-polarizing partially reflective coatings may also be used. Note that many coatings, in general, whether s-polarizing or p-polarizing, will reflect some component of the s-polarized light and some component of the p-polarized light and transmit some of each component as well.

In one embodiment, the interface 331 between the light homogenizing device 321 and the optical input device 301 also comprises a partially reflective coating layer 334. When the light received by the light homogenizing device 321 intersects this interface 331, portions of the light pass through the interface 331, while another portion is reflected. In so doing, additional copies of the light are made. Further, as the light homogenizing device 321 is offset relative to the optical input device 301, the copies made at the interface 331 are offset as well.

Figure 5:
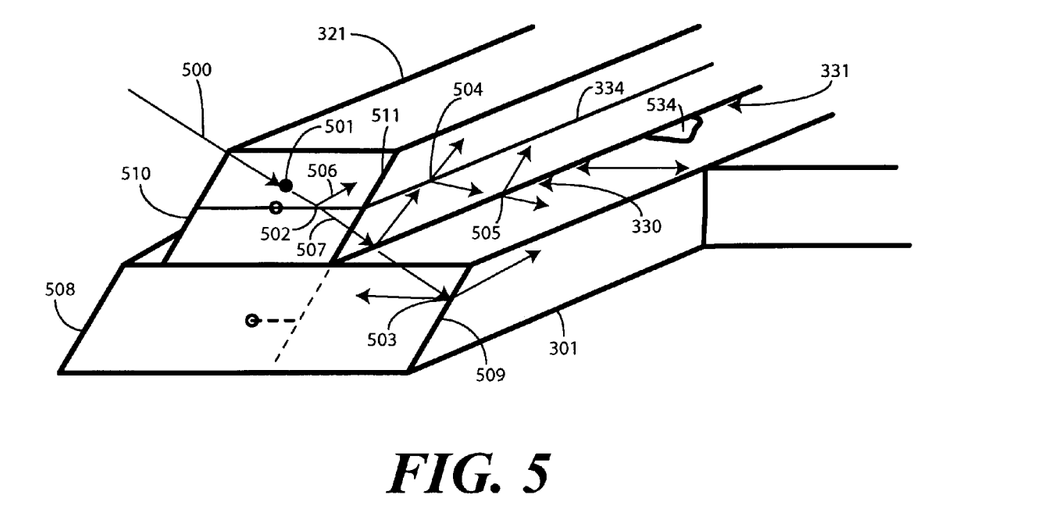
FIG. 5 illustrates a perspective view of an input device and light homogenizer in accordance with embodiments of the invention.

Referring briefly to FIG. 5, the partially reflective coating layers 334,534 can be seen. The light homogenizing device 321 is disposed atop the optical input device 301 in an off-set orientation. The partially reflective coating layer 334 is disposed within the light homogenizing device 321, while the partially reflective coating layer 534 is disposed along the interface 331 between the light homogenizing device 321 and the optical input device 301.

When light 500 enters the light homogenizing device 321, such as at point 501, the light 500 intersects the partially reflective coating layer 334 at point 502. A portion 506 of the light 500 is reflected, while a portion 507 of the light 500 passes through the partially reflective coating layer 334. Thus, a copy of the incoming light 500 is made. Another copy is made when the portion 507 of light intersects partially reflective coating layer 534 at point 503. Another copy is made at point 504, another at point 505, and so forth. The light 500 in each of the light homogenizing device 321 and optical input device 301 is confined, in one embodiment, by total internal reflection.

As shown, when light encounters partially reflective coating layer 534, some of the light enters the optical input device 301. When this light encounters either side edge 508,509 of the optical input device 301, it mimics the path that it had in the light homogenizing device 321 due to the offset 330 between the edges 510,511 of the light homogenizing device 321 and the edges 508,509 of the optical input device 301. Thus, copies of the light that travel for some length in the light homogenizing device 321 and copies of the light that travel for that same length in the optical input device 301 are offset from each other in both directions. At the same time, the light traveling in light homogenizing device 321 passes through partially reflective coating layer 534 when it encounters edges 508 or 509. Such offsets result in a high degree of light homogenization in both directions across partially reflective coating 337, which results in a more uniform image. At the same time, the partially reflective coating layers 334,534 can be placed in parallel planes, thereby simplifying manufacture and reducing cost.

One advantage of embodiments of the present invention over the prior art is the fact that complicated, expensive p-polarizing partially reflective coatings can be reduced or eliminated from the design of the input devices. As the light homogenizing device 321 is offset from the optical input device 301, p-polarized copies are made when the light intersects the edges 508,509 of the optical input device 301. As such, one need only use s-polarizing partially reflective coatings as the partially reflective coating layers 334,534 to obtain sufficient homogenization. For example, in one embodiment, the partially reflective coating layer 334 comprises only a two-layer s-polarizing partially reflective layer.

Another advantage offered by embodiments of the present invention is the exploitation of phase change occurring upon reflection. Each interaction of light with a surface at angles associated with propagation inside the substrate guided relay 300 causes a phase change in the reflected light. These reflections can be from an air/glass boundary, can be caused by a coating, or can be caused by total internal reflection. The polarization make-up of the light thus changes as it propagates. Though coatings may be designated as "p-polarization" or "s-polarization," in practice they reflect light of all polarization to some extent. The relationship of s-polarization and p-polarization coatings associated with the present invention creates a uniform distribution of light with reduced losses compared to prior art substrate guided relays.

Turning now back to FIGS. 3 and 4, the optical input device 301 is coupled to the optical substrate 302 at a second interface 335 surface. In one embodiment, the optical input device 301 is coupled to the optical substrate 302 such that the lengthwise axis 324 of the optical input device 301 and the lengthwise axis 336 of the optical substrate 302 are non-orthogonal. In one embodiment, the angle is between 30 and 60 degrees, such as an angle of 40 or 45 degrees.

Note that in some prior art systems, homogenization was performed with a multi-layer substrate having a partially reflective coating that was perpendicular to a coating disposed between the input device and the substrate. As such, one coating was s-polarizing, while the other was p-polarizing. While such an embodiment functions, issues can arise due to the variation in reflection as a function of wavelength of the p-polarization partially reflecting coating. Further, the complexity of such an assembly is complicated and expensive to manufacture. This perpendicular coating structure complicates design, manufacture, and assembly of the substrate guided relay.

Embodiments of the present invention address such problems with a single layer optical substrate. As the stacked light homogenizing device 321 and optical input device 301 create a high degree of homogenization, in one embodiment the optical substrate 302 can be a single layer optical substrate with no additional partially reflective surfaces required therein. As such, the optical substrate can be fabricated as a much thinner device than can prior art optical substrates. For this reason, embodiments of the present invention are well suited for near-to-eye applications, including eyeglass-mounted displays.

Other advantages of the single layer optical substrate include the fact that the single layer, devoid of homogenization layers, offers a higher light transmission factor than do prior art optical substrates. Next, the single layer optical substrate helps to eliminate interference fringes that can occur in the output in some embodiments of prior art substrate guided relays employing multi-layer optical substrates. Further, the overall thickness of the single layer substrate can be cut in half relative to prior art, multilayer substrates. Finally, the optical output device design can be simplified when a single layer optical substrate is used.

In one embodiment the interface 335 between the optical substrate 302 and the optical input device 301 includes a partially reflective coating 337. While this partially reflective coating 337 can be either an s-polarizing partially reflective coating or a p-polarizing partially reflective coating, in one embodiment, the partially reflective coating 337 comprises a p-polarizing partially reflective coating incorporating a metal such as silver. P-polarization partially reflecting coatings, while sometimes being more expensive than s-polarization partially reflecting coatings, are sometimes used due to their angular advantage. The coating can be designed such that light used to create the lower portion of an output image will have a slightly higher transmission, thereby letting more of the light through were it is needed. Similarly the coating can be designed such that light needed for the top of the image is preferentially reflected so that more of it is available to be coupled from the optical input device 301 to the optical substrate 302 through the upper portion of the optical input device 301.

The optical output device 303 is coupled to the optical substrate 302 at a distal location relative to the optical input device 301. The optical output device 303 is configured to receive light from the optical substrate 302 and to direct the light away from the optical substrate via one or more partially reflecting surfaces 304. Note that the optical output device 303 can be coupled to the optical substrate 302 on either side of the optical substrate 302. In one embodiment, a partially reflective coating, such as a 50% s-polarizing partially reflective interference layer coating, may be disposed between the optical output device 303 and the optical substrate 302. In one embodiment, this coating is selected to have a substantial reflectance (such as 50%) for light corresponding to angles confined within the optical substrate 302 (e.g., 40-60 degrees), while also having a low reflectance (such as 10%), for both polarizations of light passing directly through the optical output device 303 and optical substrate 302.

Note also that the partially reflective coating disposed between the optical output device 303 and the optical substrate 302 can be designed so as to have a varying reflectance layer across its interface. A variable reflectance may be used due to its larger optical extent, and also due to the fact that it is therefore not in the user's "see-through" path. As such, the coating does not affect the view of the real world. For example, regions of the output optical device 303 disposed closer to the optical input device 301 may have an area of higher reflectivity (such as 60 percent), while regions of the output optical device 303 disposed more distally relative to the optical input device 301 may have an area of lower reflectivity (such as 40 percent). Further, the varied reflectivity surface may have discrete sections, or may continually vary, such as incrementally varying from a high reflectivity at area to a low reflectivity at area. Additionally, reflectivity may vary as a function of angle of incident light, polarization of incident light, wavelength of incident light, or any combination thereof. Varying the reflectivity/transmissivity provides—in some applications—for a different transmission of light beams from the optical substrate 302 to the optical output device 303.

The one or more partially reflecting surfaces 304 help to reflect light out of the substrate guided relay 300. In one embodiment, the one or more partially reflecting surfaces 304 are partially reflective so as to provide a visual image to a viewer while still permitting the viewer to see through the overall substrate guided relay 300. As such, a user employing the substrate guided relay 300 as a display apparatus in eyeglasses would be able to concurrently see both images afar and images presented by the substrate guided relay 300.

In one embodiment, the one or more partially reflecting surfaces 304 may be disposed substantially parallel with respect to one another. In some applications, the one or more partially reflecting surfaces 304 may have substantially similar partial reflection coatings creating a substantially uniform optical output device transmission so that ambient light passing through the optical output device 303 is substantially uniform. In other applications, one or more partially reflecting surfaces 304 may be spaced in such a way that ambient beams of light may pass through the optical output device 303 without impinging on any of the reflective surfaces, thereby improving "see-through" transmission. In other applications, partially reflecting surfaces 304 may be spaced in such a way that ambient beams pass through more than one reflective surface. Such a configuration can enhance homogenization. Additional details about the construction of suitable partially reflective surfaces may be found in application Ser. No. 11/603,964, entitled "Substrate-Guided Display with Improved Image Quality," filed Nov. 21, 2006 and incorporated by this reference in its entirety.

When using a single layer optical substrate, which has a higher transmission factor than do prior art, multi-layer substrates, the design of the optical output device 303 can be greatly simplified. For example, experimental modeling has shown that as few as one-third the number of partial reflecting layers is required for adequate output uniformity and size for a given thickness of the optical output device 303 when the optical output device 303 is placed on the face of the optical substrate 302 farthest from the viewer. This results in an optical output device 303 that is easier to manufacture. Other benefits include the fact that a larger contact area can exist between the optical substrate 302 and the optical output device 303, a thinner optical output device 303 is possible, and that manufacture and fabrication are simplified.

Figure 6:
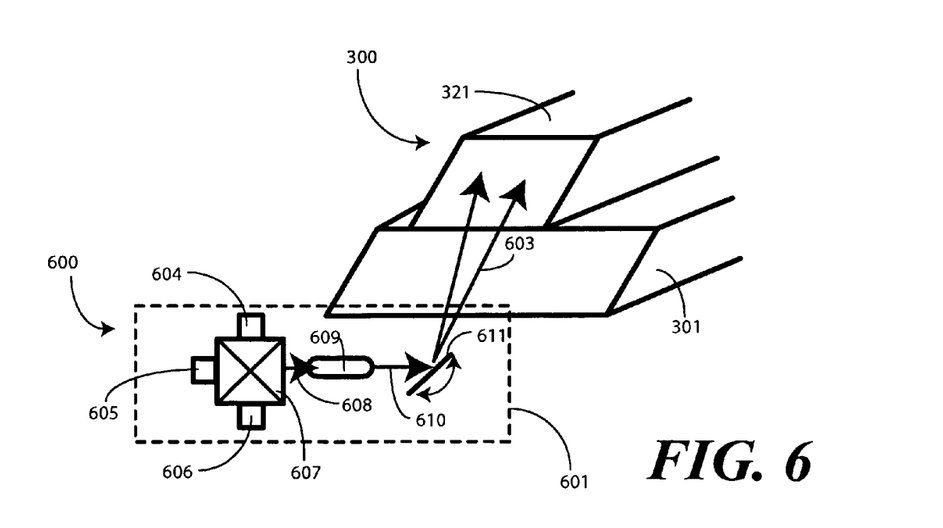
FIG. 6 illustrates one embodiment of a MEMS scanned light source suitable in use with a substrate guided relay in accordance with embodiments of the invention.

Turning now to FIG. 6, illustrated therein is a schematic diagram of a system 600 for presenting images to a user. The system 600 includes a display engine 601 and a substrate guided relay 300 configured as a light transmission device. Together, the display engine 601 and the light transmission device work to direct light from the display engine 601, across the light transmission device, and to the user's eye.

In one embodiment, the display engine 601 comprises a scanned beam display engine configured to provide an adjustable or variable accommodation scanned beam 603 into the substrate guided relay 300. A beam combiner 607 combines the output of light sources 604,605, and 606 to produce a combined modulated beam 608. A variable collimation or variable focusing optical element 609 produces a variably shaped beam 610 that is scanned by the scanning mirror 611 as variably shaped scanned beam 608, which is launched into the light homogenizing device 321.

In one embodiment, the display engine comprises a MEMS display engine that employs a MEMS scanning mirror to deliver light from the plurality of light sources 604,605, and 606 to the light homogenizing device 321. MEMS scanning display engines suitable for use with embodiments of the present invention are set forth in US Pub. Pat. Appln. No. 2007/0159673, entitled, "Substrate-guided Display with Improved Image Quality"; which is incorporated by reference herein.

Figure 7:
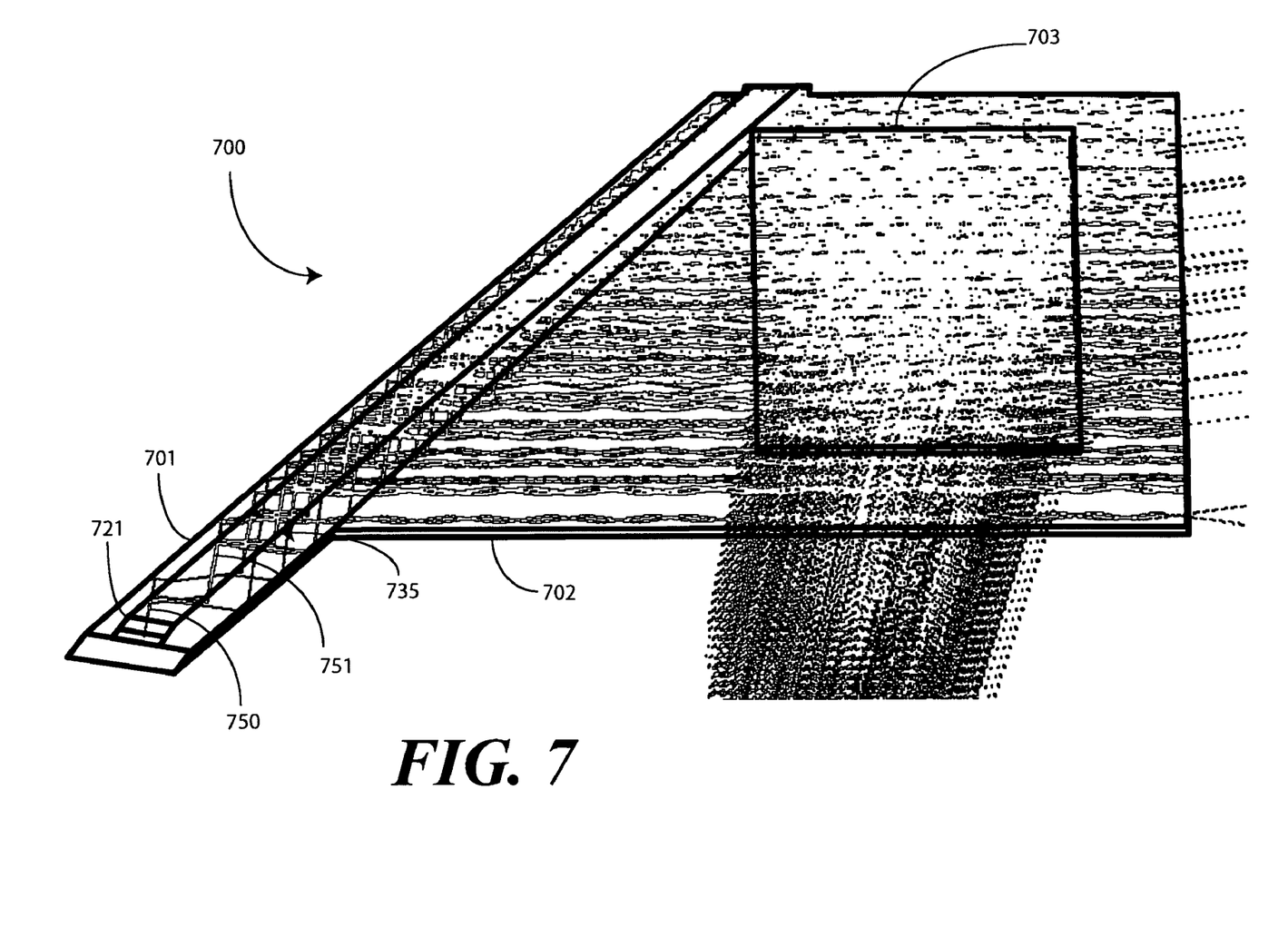
FIG. 7 illustrates a multiplication of light in a substrate guided relay in accordance with embodiments of the invention.

Turning now to FIG. 7, illustrated therein is an isometric view illustrating the presence of light waves within a substrate guided relay 700 in accordance with embodiments of the invention. As with other embodiments set forth above, the substrate guided relay 700 includes a light transmitting substrate 702 and an optical input device 701 coupled to the light transmitting substrate 702 at a first interface 735. In some embodiments the first interface 735 will be orthogonal with the optical axis of the light transmitting substrate 702. In other embodiments, the first interface 735 will be non-orthogonal optical axis of the light transmitting substrate 702. A light homogenizing device 721 is coupled to the optical input device 701 and is configured to receive light from a source and to make copies of the received light.

For the purposes of illustration, the received light 750 is depicted as a single beam. In this example, the light transmitting substrate 702 homogenizes the light, creating additional light beams 751 from the single beam of light. Some of these additional light beams 751 then pass into the optical input device 701 as the light spirals down the light homogenizing device 721 For example, more than 100,000 beams may be created from a single beam inserted into the light homogenizing device.

The light beams then travel to the optical output device 703 via the light transmitting substrate and are delivered to the optical output device 703 for presentation to a viewer. Such relays can be configured to present large fields of view from small, scanned light sources. Experimental testing has shown that 40-degree fields of view are achievable due to the large amount of homogenization occurring within the light transmitting substrate 702.

The design of the substrate guided relay 700 shown in FIG. 7 offers a thin, compact form factor that may be incorporated into lightweight devices such as eyeglasses, helmet shields, or other display devices. Such display devices may be transparent or non-transparent. Other devices, such as mobile communication devices may also employ the relays.

Figure 8:
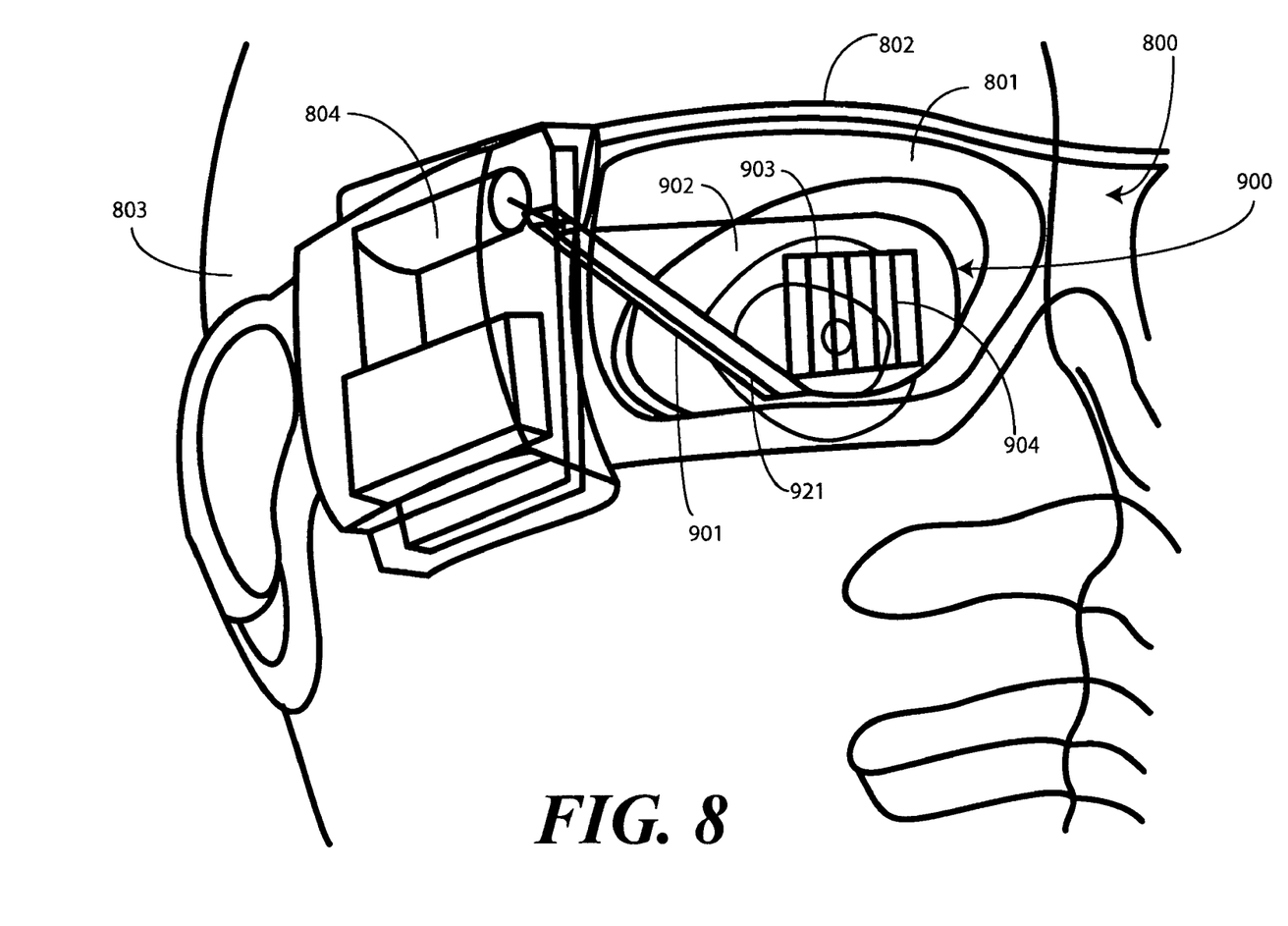
FIG. 8 illustrates one embodiment of an eyewear device employing a substrate guided relay in accordance with embodiments of the invention.

Turning now to FIG. 8, illustrated therein is one embodiment of an eyewear device 800 using an optical substrate guided relay 900 in accordance with embodiments of the invention. The eyewear device 800 is configured to present visible images to the wearer 803 by projecting those images into the wearer's eye. The eyewear device 800 includes lens assemblies 801 that are coupled to a frame 802. In one embodiment, one of the lens assemblies 801 has integrated therewith an optical substrate guided relay 900 configured in accordance with embodiments of the invention.

The optical substrate guided relay 900 includes a light homogenizing device 921 coupled to an optical input device 901. The light homogenizing device 921 is configured to receive light from an image producing source 804 that is integrated with the frame 802. When the image producing source 804 delivers light to the light homogenizing device 921, the light homogenizing device 921 makes at least one copy of that light. In many embodiments, the light homogenizing device 921 will eventually make thousands of copies of the light as the light propagates along the length of the light homogenizing device 921.

In one embodiment, the optical input device 901 is coupled to the light homogenizing device 921 in an offset configuration as described above. As light spirals down the length of the light homogenizing device, portions of the light and its copies are delivered to the optical input device 901.

An optical substrate 902 is coupled to the optical input device 901. In one embodiment, the optical substrate guided relay 900 has an overall L-shaped cross section. As such, in that embodiment the optical substrate 902 is coupled to the optical input device 901 at an orthogonal orientation relative to the coupling of the light homogenizing device 921. The optical input device 901 delivers light to the optical substrate 902 across an interface. Light then propagates across the optical substrate 902. In one embodiment, the light is confined to the optical substrate 902 by total internal reflection.

An optical output device 903 is coupled to a major face of the optical substrate 902 at a location that is distal relative to the optical input device 901. The optical output device 903 is configured to receive the light and its copies from the optical substrate 902. The optical output device 903 then delivers the light and its copies to the user's pupil with the assistance of one or more partially reflective surfaces 904 disposed within the optical output device 903.

In one embodiment, the eyewear device 800 (as well as the optical substrate guided relay 900) is configured such that the wearer can see images beyond the lens assemblies 801 while the image-producing source 804 is active. Structures for such far-field vision are described above.

In one embodiment, the image-producing source 804 comprises a MEMS scanned laser source. Such sources are small and lightweight, and are thus easily integrated into the frame 802 of the eyewear device 800.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical substrate guided relay, comprising:
   an optical input device and an optical substrate coupled together; and
   a light homogenizing device coupled to the optical input device;
   wherein a lengthwise central axis of the optical input device is offset from a lengthwise central axis of the light homogenizing device, wherein the offset comprises a non-orthogonal angle.

2. The optical substrate guided relay of claim 1, wherein the optical input device and the optical substrate define a first plane, further wherein the light homogenizing device and the optical input device define a second plane, wherein the first plane and the second plane are substantially orthogonal.

3. The optical substrate guided relay of claim 2, wherein each of the optical input device and the light homogenizing device comprise at least one edge substantially parallel with the second plane, wherein the at least one edge of the optical input device is offset from the at least one edge of the light homogenizing device relative to the second plane.

4. The optical substrate guided relay of claim 2, wherein the light homogenizing device comprises at least one internal partially reflective coating layer disposed substantially parallel to the first plane.

5. The optical substrate guided relay of claim 1, wherein the optical input device has associated therewith a first cross sectional width, wherein the light homogenizing device has associated therewith a second cross sectional width, wherein the second cross sectional width is shorter than the first cross sectional width.

6. The optical substrate guided relay of claim 1, wherein the light homogenizing device is configured to receive light from a source and create at least one offset copy of the light.

7. The optical substrate guided relay of claim 1, wherein the optical input device and the light homogenizing device are coupled together at a first interface surface, the first interface surface being disposed in an off-center location along an edge of the optical input device.

8. The optical substrate guided relay of claim 7, wherein the optical input device and the optical substrate are coupled together at a second interface surface.

9. The optical substrate guided relay of claim 8, wherein at least one of the first interface surface or the second interface surface comprises a partially reflective coating.

10. The optical substrate guided relay of claim 9, wherein the partially reflective coating comprises one of an s-polarizing partially reflective coating or a p-polarizing partially reflective coating.

11. The optical substrate guided relay of claim 10, wherein the partially reflective coating disposed along the first interface surface comprises the s-polarizing partially reflective coating, further wherein the partially reflective coating disposed along the second interface surface comprises the p-polarizing partially reflective coating.

12. The optical substrate guided relay of claim 1, wherein a lengthwise axis of the optical input device and a lengthwise axis of the light homogenizing device are substantially parallel.

13. The optical substrate guided relay of claim 12, wherein a lengthwise axis of the optical substrate is non-orthogonal with the lengthwise axis of the optical input device.

14. The optical substrate guided relay of claim 1, wherein the optical substrate comprises a single layer optical substrate.

15. The optical substrate guided relay of claim 14, further comprising an optical output device coupled to the single layer optical substrate distally from the optical input device and configured to receive light from the optical substrate and direct the light away from the optical substrate with one or more partially reflective surfaces disposed within the optical output device.

16. The optical substrate guided relay of claim 15, further comprising a partially reflective interference layer disposed between the single layer optical substrate and the optical output device.

17. A system for presenting images to a user, comprising:
    a display engine; and
    a light transmission device comprising:
    a light transmitting substrate;
    an optical input device coupled to the light transmitting substrate at a first interface; and
    a light homogenizing device coupled to the optical input device at a second interface, the second interface being substantially orthogonal with the first interface;
    wherein the light homogenizing device is disposed at an offset location along the second interface, wherein the offset comprises a non-orthogonal angle.

18. The system of claim 17, wherein the display engine comprises a plurality of light sources and at least one MEMS scanning mirror, wherein the display engine is configured to deliver light to the light homogenizing device.

19. An eyewear device having lens assemblies coupled to a frame and being capable of presenting visible images to a wearer, the eyewear device comprising:
    an image-producing source integrated with the frame; and
    an optical substrate guided relay integrated with at least one of the lens assemblies and comprising:
    a light homogenizing device configured to receive light from the image-producing source and to make at least one copy of the light;
    an optical input device coupled to the light homogenizing device in an offset configuration relative to the light homogenizing device and configured to receive the light and the at least one copy of the light from the light homogenizing device, wherein the offset comprises a non-orthogonal angle;
    an optical substrate coupled to the optical input device at an orthogonal orientation relative to the light homogenizing device and configured to receive the light and the at least one copy of the light from the optical input device coupled together; and
    an optical output device coupled to the optical substrate distally from the optical input device and configured to receive the light and the at least one copy of the light from the optical substrate and to deliver the light and the at least one copy of the light to an eye of the wearer with one or more partially reflective surfaces disposed within the optical output device.

20. The eyewear device of claim 19, wherein the optical substrate guided relay is configured such that the wearer can see images beyond the lens assemblies while the image-producing source is active.

* * * * *

UNITED STATES PATENT AND TRADEMARK OFFICE
CERTIFICATE OF CORRECTION

PATENT NO. : 7,570,859 B1
APPLICATION NO. : 12/167892
DATED : August 4, 2009
INVENTOR(S) : Christian Dean DeJong Page 1 of 1

It is certified that error appears in the above-identified patent and that said Letters Patent is hereby corrected as shown below:

Column 1: line 4,

Add the following Government Rights Statement after the title and before the Background Section:

STATEMENT REGARDING FEDERALLY SPONSORED RESEARCH OR DEVELOPMENT

This invention was made with government support under Contract Number FA8650-06-C-6724 awarded by the U.S. Air Force. The government has certain rights in the invention.

Signed and Sealed this
First Day of October, 2013

Teresa Stanek Rea
*Deputy Director of the United States Patent and Trademark Office*